United States Patent [19]
Quee

[11] 4,116,756
[45] Sep. 26, 1978

[54] SPRAY DRYING ON WOVEN BELT OF MONOFILAMENT SYNTHETIC FIBER

[75] Inventor: Jack A. Quee, Fond du Lac, Wis.

[73] Assignee: Dec International, Inc., Madison, Wis.

[21] Appl. No.: 769,143

[22] Filed: Feb. 16, 1977

Related U.S. Application Data

[63] Continuation of Ser. No. 579,902, May 22, 1975, abandoned.

[51] Int. Cl.² .............................................. B01D 1/00
[52] U.S. Cl. ................................ 159/45; 159/4 VM; 34/236; 139/413
[58] Field of Search ................. 159/4 R, 4 MS, 4 SR, 159/4 VM, 48 R, 49, DIG. 3, DIG. 4, DIG. 14; 139/408, 410, 413

[56] References Cited
U.S. PATENT DOCUMENTS

| | | | |
|---|---|---|---|
| 1,994,280 | 3/1935 | Hindle | 139/140 |
| 2,621,684 | 12/1952 | Love | 139/413 |
| 2,788,023 | 4/1957 | Renaud | 139/410 |
| 2,846,314 | 8/1958 | Kelly | 159/49 R |
| 2,931,067 | 4/1960 | De la loye | 159/48 R |
| 2,981,629 | 4/1961 | Ginnette | 159/49 R |
| 3,031,313 | 4/1962 | Morgan | 159/DIG. 4 |
| 3,615,723 | 10/1971 | Meade | 159/48 R |
| 3,675,393 | 7/1972 | Meade | 159/48 R |

FOREIGN PATENT DOCUMENTS 668,534   8/1963   Canada .............................. 159/DIG. 3

*Primary Examiner*—Norman Yudkoff
*Attorney, Agent, or Firm*—Michael, Best & Friedrich

[57] ABSTRACT

A processing housing containing a primary stage spray chamber, a filter stage and redryer chamber, a second stage drying chamber and a cooling stage chamber all in communication one with the other. The primary stage spray chamber has an outlet at the lower end thereof and at least one hot gas inlet port thereof in the upper portion thereof with a source of drying gas connected thereto. At least one spray nozzle extends into the spray chamber and a draft producing means is provided to force the drying gas from the gas source through the spray chamber and out through the outlet thereof. An endless connecting belt is supported for horizontal movement adjacent the outlet of the spray chamber, said belt traveling from the primary stage spray chamber through the filter stage redryer chamber, then through the second stage drying chamber and then through the cooling stage chamber. The belt is in the form of a double layer woven fabric consisting of two layers of one yarn system and a second yarn system interconnecting the two layers of the one yarn system.

9 Claims, 3 Drawing Figures

SPRAY DRYING ON WOVEN BELT OF MONOFILAMENT SYNTHETIC FIBER

This is a continuation of application Ser. No. 579,902 filed May 22, 1975 now abandoned.

BACKGROUND OF THE INVENTION

I. Field of the Invention.

This invention relates to a food processing apparatus and more particularly to apparatus for separation of liquid from a mixture of solid food particles and liquid.

II. Description of the Prior Art.

Apparatus of the general type disclosed in this application is described in U.S. Pat. Nos. 3,741,273 and 3,615,723. The combination of the present invention utilizing a collector belt constructed in the form of a double layer woven fabric consisting of two layers of one yarn system and a second yarn system interconnecting the two layers of the one yarn system is materially superior to prior apparatus utilizing collector belts made from thin perforated stainless steel sheet or made from stainless steel wire screen in that the combination of the present invention serves to very effectively separate the solid particles from the fluid in the material mass deposited on the belt with a high percentage of the solid material retained on the belt and the fluid material readily passing through the belt.

SUMMARY OF THE INVENTION

A drying apparatus comprising the combination of an enclosed primary stage spray chamber having an outlet at the lower end thereof and at least one hot gas inlet port in the upper portion thereof with a source of drying gas communicating with the inlet port. A spray nozzle extends into the spray chamber for introducing the material to be processed therein. A draft producing means is connected with the chamber for forcing the drying gas from the gas source through the chamber and out through the outlet of the chamber. An endless collecting belt is supported and driven in a horizontal direction adjacent the chamber outlet. The belt is constructed in the form of a double layer woven fabric consisting of two layers of one yarn system and a second yarn system interconnecting the two layers of the one yarn system. The belt serves to effectively separate the liquid from the solid particles in the food material deposited on the belt with the solid material retained on the belt and the fluid material passing through the belt.

DESCRIPTION OF THE PREFERRED EMBODIMENT

Figure 1:
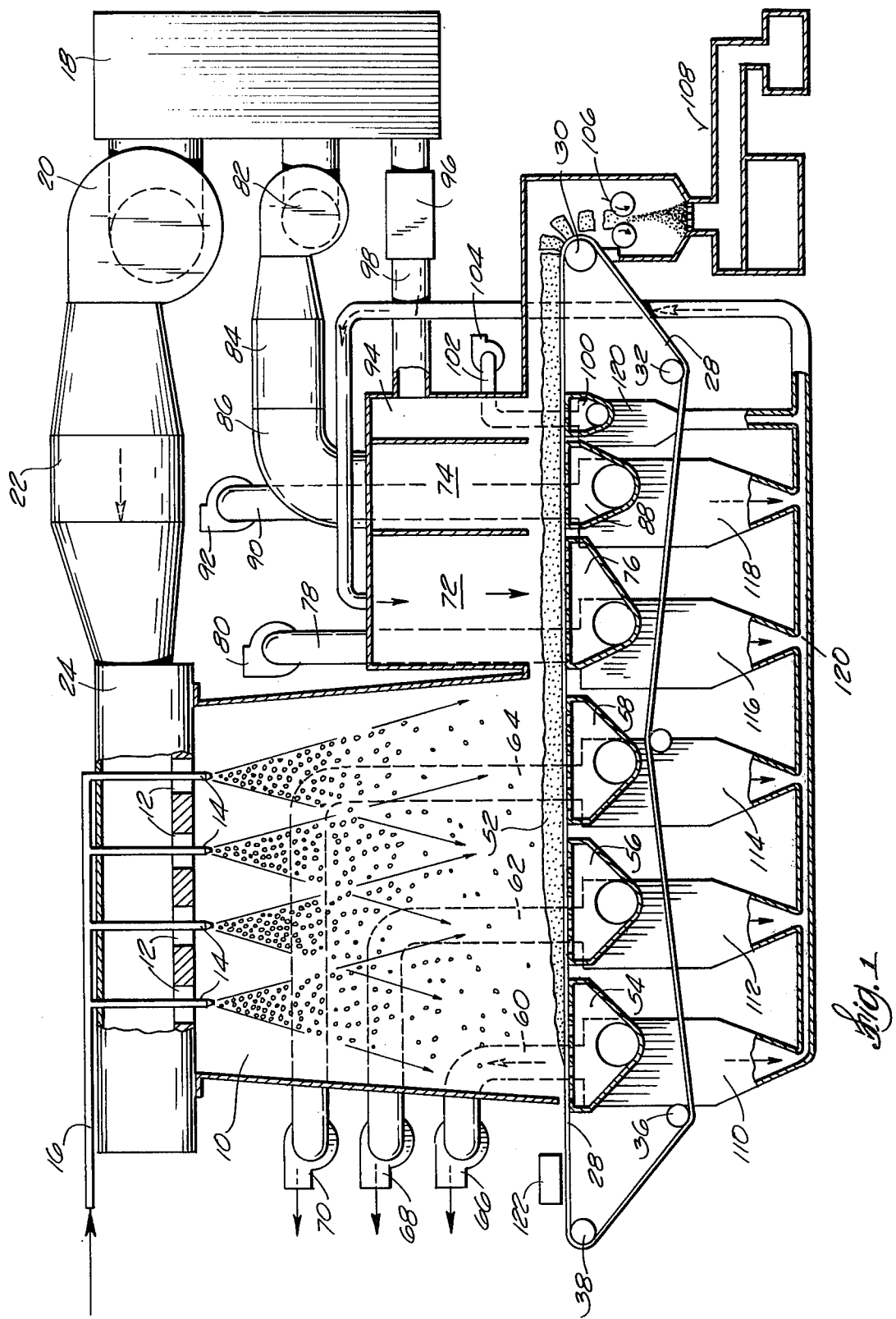
FIG. 1 is a partially schematic side elevation view of a spray drying apparatus showing one embodiment of the present invention.

The apparatus shown in FIG. 1 is comprised of an enclosed primary stage spray chamber 10 having a plurality of hot air inlet ports 12 in the upper portion thereof. Extending vertically downwardly through each port 12 is a spray nozzle 14 which communicates through a supply duct 16 to a source of fluid product to be dried (not shown).

Hot air inlet ports 12 communicate with the outside atmosphere through a filter unit 18, a blower 20, heater unit 22 and a duct 24.

The mixture to be dried contains a solid material either dissolved or suspended therein, e.g., milk, vegetable or fruit juices, etc. Broadly speaking, the process for drying a mixture of fluid and solid material involves the introduction of a liquid spray into a drying chamber together with a source of dry desiccating gas such as heater air. The liquid sprayed from the nozzles 14 is initially present in the form of wet droplets 26. These droplets are entrained in the heated air passing downwardly through ports 12 from duct 24. As the particles pass downwardly, they strike a moving belt 28 mounted for horizontal movement on rollers 30, 32, 34, 36 and 38. The upper horizontal portion of the belt is driven to the right as viewed in FIG. 1 by any suitable means such as, for example, a motor connected to roller 30 by a drive belt (not shown).

Belt 28 is in the form of a double-layer woven fabric made from monofilament synthetic fiber material consistinbg of two layers of one yarn system and a second yarn system interconnecting the two layers of the one yarn system. More specifically the fabric is comprised of two layers of weft yarns with a plurality of warp threads interconnecting said two layers. In the preferred embodiment the belt 28 is designed for processing various food products. In such application the material must be chemically inert to food in a temperature range of about 0°–300° F. and should be odorless, colorless and tasteless. It has been found that synthetic fiber made from polyester plastic provides good results.

Figure 3:
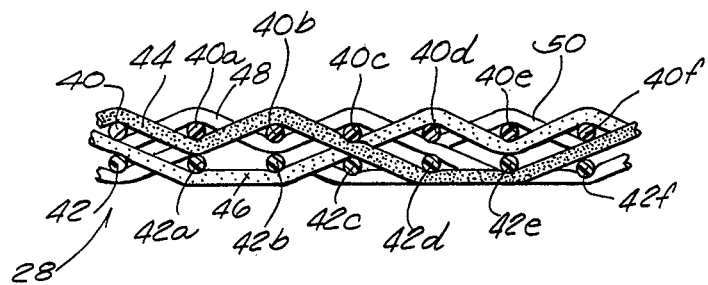
FIG. 3 is a sectional view taken along line 3—3 of FIG. 2.
Figure 2:
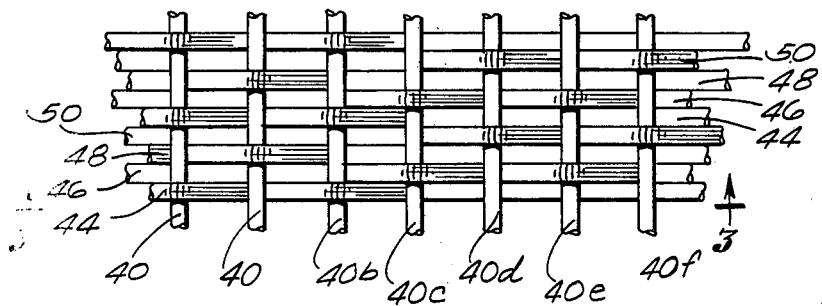
FIG. 2 is an enlarged fragmentary top view of a portion of the woven collecting belt used in the apparatus shown in FIG. 1.

A specific embodiment of a belt construction which has performed in a highly satisfactory manner in the spray drying apparatus of the present invention is shown in FIGS. 2 and 3. The structure consists of two layers of weft threads 40, 40a –40f and 42, 42a –42f and a plurality of warp threads 44, 46, 48 and 50 interconnecting the two layers of weft threads. The first warp thread 44 weaves above the first pair of weft threads 40, 42, between the second pair of weft threads 40a, 42a, above the third pair of weft threads 40b, 42b, between the fourth pair of weft threads 40c, 42c, below the fifth and sixth pairs of weft threads 40d, 42d, 40e, 42e and then between the seventh pair of weft threads 40f, 42f. Warp threads 46, 48 and 50 are similarly woven between the pairs of weft threads. The weave pattern shown in FIGS. 2 and 3 is repeated every six warp threads.

The double layer woven fabric described above is particularly well designed for use in a spray dryer and similar environments wherein food materials are deposited on the upper surface of the belt. This is true because the particular woven construction illustrated and described provides good retention of the solid particles in such material, i.e. prevents passage of such solid particles through the belt and at the same time provides easy passage of fluids (including both air and liquid) through the belt to provide the desired curing and drying action to the solid material retained on the belt. In other words the woven belt construction provides a minimum of linear passageways extending directly through the belt from top to bottom and yet provides an extensive system of non-linear circuitous passageways through the belt to allow relatively easy passage of fluids. The belt thus serves to very effectively separate the solid particles from the fluid in the material mass deposited on the belt with the solid material retained on the belt and the fluid material passing through the belt.

Another advantage of the double layer woven fabric collection belt 28 made from synthetic fiber material is the fact that the material of such belt will not absorb heat to any material degree (as compared to prior belts made of metal) and thus problems of adhesion of the collected product to the belt are minimized.

The particles deposited on belt 28 are brought into contact with one another while the surfaces thereof are in a tacky condition to form bonds at the points of contact between the particles to thereby form a mat 52 on the upper surface of the belt. Once the mat begins to form on the belt the heater air will begin to stream over and around the particles and through the minute interstices between the particles in the mat and then, as indicated, through the circuitous non-linear passageways in the belt. The drying air then flows into chambers 54, 56 and 48 beneath the belt and then out to the atmosphere through ducts 60, 62 and 64, and exhaust blowers 66, 68 and 70. As indicated previously, the belt 28 is driven to the right as shown in FIG. 1 (as indicated by arrows) to thereby carry the mat formed in the primary stage spray chamber 10 into a retention filter stage and redryer chamber 72. In such retention chamber 72 heated air from both the adjacent main spray chamber 10 and a second stage drying chamber 74 is drawn through the mat 52 and belt 28 into a chamber 76 below the belt and then out to atmosphere through a duct 78 and an exhaust blower 80.

The mat 52 then passes from chamber 72 to the second stage drying chamber 74. Heated air is supplied to the top of chamber 74 through filter unit 18, a blower 82, a heater 84 and a duct 86. Heated air is drawn through the mat and belt from chamber 74 into a chamber 88 below the belt and then out to atmosphere through a duct 90 and an exhaust blower 92.

The mat then passes from chamber 74 to a final cooling chamber 94. Air from atmosphere is drawn through filter unit 18, a unit 96 to cool and dehumidfy the air supply and a conduit 98. The cooled air passes through the mat and belt into a chamber 100 out to atmosphere through a conduit 102 and an exhaust blower 104.

It is noted that the primary stage chamber 10, the filter stage and redryer chamber 72, the second stage drying chamber 74 and the cooling stage chamber 94 are all built into a single housing with the respective chambers defined therein by vertical partitions and with the chambers all in communication one with the other. With this construction the product carried on the belt from one stage to the next will be processed without physically disturbing the product on the belt. This arrangement prevents any undesirable loss of heat in the product as compared to an arrangement where the product is transferred from one enclosed chamber to another separate enclosed chamber and also prevents any damage to the product which can result from physical disturbance thereof which becomes necessary if the product is physically dumped from one stage to the next.

From the cooling stage chamber 94 the mat passes to the end of the belt where it is cut and crushed into small particles by a suitable device identified by the reference numeral 106. The product is then sized and transmitted from the apparatus by a suitable mechanism shown schematically and identified by reference numeral 108.

Any fine particles which pass through the belt during the processing as described above are collected by suitable cyclone collection units 110, 112, 114, 116 and 118, which particles are then recirculated back to chamber 72 for reprocessing through a conduit 120.

A suitable belt dryer 122 is provided at the left hand end of the belt as shown in FIG. 1 to maintain the belt at the proper moisture level as it enters the primary stage spray chamber 10.

I claim:

1. A spray drying apparatus comprising the combination:
   an enclosed primary stage spray chamber having an outlet at the lower end thereof; at least one hot gas inlet port in the upper portion thereof and a source of drying gas communicating therewith;
   at least one spray nozzle extending into the spray chamber; a draft producing means connected to communicate with the chamber for forcing the drying gas from the gas source through the chamber and out through the outlet thereof; an endless collecting belt supported for horizontal movement at the chamber outlet, said belt being in the form of a double layer woven fabric comprised of two layers of weft threads with a plurality of warp threads interconnecting said two layers, the material of said weft and warp threads being monofilament synthetic fiber; and
   drive means for advancing said belt.

2. A spray drying apparatus according to claim 1 in which said synthetic fiber is polyester plastic.

3. A drying apparatus comprising the combination:
   a processing chamber having an outlet in the lower portion thereof;
   an endless collecting belt supported for horizontal movement through said processing chamber, said belt being in the form of a double layer woven fabric comprised of two layers of weft yarns with a plurality of warp threads interconnecting said two layers, the material of said weft yarns and warp threads being a monofilament synthetic fiber;
   drive means for advancing said belt; and
   means for depositing particles of food on said endless belt to form a mat of food particles thereon, said food particles including a mixture of solids and liquids with a substantial portion of said liquid content passing from the mat through the belt during the transfer of the mat through the processing chamber.

4. A drying apparatus according to claim 3 in which said synthetic fiber is polyester plastic.

5. A spray drying apparatus comprising the combination:
   an enclosed primary stage spray chamber having an outlet at the lower end thereof, at least one hot gas inlet port in the upper portion thereof and a source of drying gas communicating therewith;
   at least one spray nozzle extending into the spray chamber, a draft producing means connected to communicate with the chamber for forcing the drying gas from the gas source through the chamber and out through the outlet thereof;
   an endless collecting belt supported for horizontal movement at the chamber outlet, said belt being in the form of a double layer woven fabric consisting of two layers of one yarn system and a second yarn system interconnecting the said two layers of said one yarn system;
   drive means for advancing said belt; and a filter stage and redryer chamber, a second stage drying chamber and a cooling stage chamber, said belt positioned to pass from said primary stage spray chamber, then through said filter stage and redryer chamber, then through said second stage drying chamber and then through said cooling stage chamber.

6. A spray drying apparatus according to claim 5 in which air is circulated through said belt from the topside thereof to the bottom side thereof as it passes through said filter stage and redryer chamber and said second stage drying chamber.

7. A spray drying apparatus according to claim 6 wherein cooling air is circulated through said belt from the topside thereof to the bottom side thereof as it passes through said cooling stage chamber.

8. The apparatus of claim 7 including a collection and recirculation means for collecting any fine particles which may pass through the belt and recirculating said particles back into said filter stage and redryer chamber.

9. A spray drying apparatus according to claim 1 in which said primary stage spray chamber, said filter stage and redryer chamber, said second stage drying chamber and said cooling stage chamber are formed inside a single housing wherein all of said chambers are in communication one with the other.

* * * * *